UNITED STATES PATENT OFFICE 2,568,992

TREATMENT FOR DRILLING FLUIDS

Todd Michael Doscher, West Los Angeles, Calif., assignor to Oil Well Chemical & Materials Co., Inc., Los Angeles, Calif., a corporation of California No Drawing. Application October 22, 1947, Serial No. 781,493

9 Claims. (Cl. 252—8.5)

This invention relates to the treatment of drilling fluids and particularly to the treatment of water base drilling fluids, such as are employed in the rotary drilling of oil wells.

In drilling wells by the rotary method it is necessary to circulate a drilling fluid in the bore hole to lubricate the drill bit, to carry the cuttings up to the surface, to hold down the formation pressures, and to form on the walls of the bore hole a sheath or cake which prevents the drilling fluid from escaping into the formation.

Drilling fluids of the water base type consist of a clay suspended in water to which weighting materials, such as barytes, galena, iron oxide, etc., are sometimes added to increase the specific gravity of the mud. The mud may be made from the natural clay which occurs at the location of the well or may be synthetically compounded from the clay and mud bases of commerce, including bentonite and beidellite.

In order to perform its function as has been noted, the composition and condition of the drilling fluid must be rather closely controlled, and that is particularly true of its water loss to the formation; for if the water loss be too high, the filter cake on the wall builds up to such an extent that circulation of the mud fluid between the drill pipe and the walls of the hole is greatly impeded. Still further reasons for keeping the filter loss at the lowest possible level are to prevent caving of the walls of the bore hole and, to obtain the best possible result when cementing the casing, a thin mud cake is desirable. Still another reason for keeping water loss at a minimum is that when contacting the oil or gas sands, the escape of water from the drilling fluid into the oil or gas sand blocks the flow of oil or gas into the bore hole and thereby lessens production from the producing sands.

A drilling fluid of low water loss may change appreciably as to this important characteristic during use. The drilling of the formation causes cuttings to enter the fluid and these cuttings may include salts or materials which increase the water loss of the drilling fluid viscosity. The salts that seem to be particularly offensive in such regard are those of calcium and magnesium.

A still further source of contamination to the drilling fluid is that brought on by cementing a formation and a subsequent drilling operation through the cement.

One of the objects of this invention therefore is to provide a drilling fluid and a treatment for a drilling fluid for effectively lowering the water loss of said fluid.

Another object is to provide a process for treating drilling fluids in order to reduce the water loss of said fluids.

A still further object of this invention is to provide an improved process for the treatment of drilling fluids with the chemical agents hereinafter set forth.

Still another object is to provide a drilling fluid which has improved qualities and characteristics adapting it particularly to the function of lubricating the drilling bit.

Further objects will appear from the description to follow, and it is understood that modifications thereof are included within the scope of the invention as set out in the appended claims.

Now I have found that one or more of the aforesaid objects may be accomplished by admixing a small amount of a high molecular weight alkali metal alkyl aryl sulphonate together with a small amount of a nonpolar antifoaming agent into a water base drilling fluid.

A suitable source of sulphonic acids for preparing the treating agents for use in accordance with the process of my invention is the sulphonic acids produced from petroleum and fractions thereof. These materials are prepared by treating selected fractions of petroleum with concentrated sulphuric acid or sulphur trioxide to produce an antifoaming acid fraction which is then neutralized with an alkali metal hydroxide such as sodium hydroxide or potassium hydroxide.

The following type formula is representative of the material produced particularly from a western petroleum crude fraction:

The sulphonates so produced may be classified as polyalkyl aryl compounds. The solubility characteristics of such sulphonates can be explained on the basis of its chemical structure. This product is composed of two unlike types of radicals; i. e., long alkyl chains derived from oil, which tend to be oil soluble but not water soluble; hydrophilic groups, such as the sodium sulphonate ($SO_3Na$) group whose affinity for water tends to create water solubility. In the type formula set out above the length of the alkyl side chains represented by $R_1$, $R_2$ and $R_3$ will determine the degree of solubility of the resulting sulphonates. The longer the alkyl chains, the less the water solubility and the greater the number of polar groups the greater the water solubility. For the purposes of this invention; i. e., the use of sulphonates in water base drilling fluids, a careful balance is required between the ratio of nonpolarity and polarity of the sulphonate.

It is preferred that the sulphonates for use in my invention be compatible with both polar and nonpolar liquids. Partial or substantial solubility in nonpolar liquids is not precluded, but only a slight, significant solubility in water is required. The invention therefore includes the use of the alkali metal salts of sulphonic acids that have some water solubility and yet soluble to a degree in nonpolar liquids. Sodium alkyl aryl sulphonates prepared from California crudes and having an average molecular weight from 400 to 600 possess the required compatibility with polar and nonpolar compounds to be useful in the process of my invention; such materials are sold commercially and are preferentially oil soluble.

In accordance with my treatment of drilling fluids the above disclosed alkali metal salts of sulphonic acids should be used in small amounts such as 3 to 10% by weight (dry basis) and preferably 4 to 6% by weight of the drilling fluid treated. The exact amount to be used substantially within these limits will vary with the improvement in the water base drilling mud desired as will be appreciated by drilling mud engineers. It will be found desirable to incorporate about 5% by volume of an antifoaming agent into the water base drilling fluid being treated in accordance with my invention.

The antifoaming agents that may be used comprise any hydrocarbon base material such as alcohols, benzene, pine oil, petroleum oils, such as crude oil, fuel oil, kerosene, and the like. The most suitable petroleum oils are those of high gravity, preferably 30 or higher. It has been found that such materials reduce the foaming that occurs due to the vigorous agitation of the drilling mud.

The actual quantities of an antifoaming agent needed will vary with the drilling fluid being treated and may be adjusted to suit the particular fluid treated by the drilling fluid engineers. In practice, from about 5 to 20% by volume will be found adequate, but larger amounts are not precluded.

As an example of the effectiveness of my method of treating a water loss drilling fluid, a drilling fluid was prepared in the usual way from Roger Lake clay and water. This drilling fluid had a water loss of 7 c. c. in thirty minutes as measured by the A. P. I. filter method. A sample of this drilling fluid was mixed with 5% by weight of sodium salt of an alkyl aryl sulphonic acid produced from a California crude oil. This sulphonate is preferentially oil soluble. The approximate molecular weight of this sulphonate was 500. To this was added 6% of a mineral oil as an antifoaming agent. The drilling fluid with the added alkyl aryl sulphonate and antifoaming agent was stirred with an electric mixer and then tested for water loss in a standard A. P. I. filter press for a period of 30 minutes. The water loss was less than one-half of that of the above mentioned drilling fluid without the additives of the instant invention.

While my invention has been described, it is intended that the description shall be taken as illustrative and that changes may be made in the products and processes within the scope of the appended claims.

What is claimed is:

1. An improved drilling fluid for oil and gas wells comprising a clay, water fluid of suitable viscosity for use in oil and gas well drilling to which has been added an amount of a preferentially oil soluble high molecular weight alkali metal alkyl aryl petroleum sulphonate sufficient to substantially reduce the fluid loss of said clay water drilling fluid and an amount of petroleum oil as an antifoaming agent at least sufficient to inhibit foaming of the resulting drilling fluid, said sulphonate being further characterized by being compatible with both said water base drilling fluid and said antifoaming agent.

2. An improved drilling fluid for oil and gas wells comprising a clay, water fluid of suitable viscosity for use in oil and gas well drilling to which has been added an amount of a preferentially oil soluble high molecular weight sodium alkyl aryl petroleum sulphonate sufficient to substantially reduce the fluid loss of said clay water drilling fluid and an amount of petroleum oil as an antifoaming agent at least sufficient to inhibit foaming of the resulting drilling fluid, said sulphonate being further characterized by being compatible with both said water base drilling fluid and said antifoaming agent.

3. An improved drilling fluid for oil and gas wells comprising a clay, water fluid of suitable viscosity for use in oil and gas well drilling, to which has been added an amount of a preferentially oil soluble high molecular weight alakli metal alkyl aryl petroleum sulphonate sufficient to substantially reduce the fluid loss of said clay water drilling fluid and an amount of a petroleum oil having a gravity in excess of 30 as an antifoaming agent at least sufficient to inhibit foaming of the resulting drilling fluid, said sulphonate being further characterized by being compatible with both said water base drilling fluid and said petroleum antifoaming agent.

4. An improved drilling fluid for oil and gas wells comprising a clay, water fluid of suitable viscosity for use in oil and gas well drilling, to which has been added an amount of a preferentially oil soluble high molecular weight sodium alkyl aryl petroleum sulphonate sufficient to substantially reduce the fluid loss of said clay water drilling fluid and at least a sufficient amount of a petroleum oil having a gravity in excess of 30 as an antifoaming agent sufficient to inhibit foaming of the resulting drilling fluid, said sulphonate being further characterized by being compatible with both said water base drilling fluid and said petroleum antifoaming agent.

5. A water clay base drilling fluid of suitable viscosity for oil and gas well drilling, said fluid consisting essentially of water, clay and a preferentially oil soluble alkali metal petroleum sulfonate in an amount of from 3 to 10% by weight on a dry basis of the weight of the drilling fluid treated, and petroleum oil in an amount sufficient to inhibit substantial foaming of the resulting drilling fluid.

6. A water clay base drilling fluid of suitable viscosity for oil and gas well drilling, said fluid consisting essentially of water, clay and a preferentially oil soluble alkali metal petroleum sulfonate in an amount of from 4 to 6% by weight on a dry basis of the weight of the drilling fluid treated, and petroleum oil in an amount sufficient to inhibit substantial foaming of the resulting drilling fluid.

7. A water clay base drilling fluid of suitable viscosity for oil and gas well drilling, said fluid consisting essentially of water, clay and a preferentially oil soluble sodium petroleum sulfonate in an amount of from 3 to 10% by weight on a dry basis of the weight of the drilling fluid treated, and petroleum oil in an amount sufficient to inhibit substantial foaming of the resulting drilling fluid.

8. A water clay base drilling fluid of suitable viscosity for oil and gas well drilling, said fluid consisting essentially of water, clay and a preferentially oil soluble potassium petroleum sulfonate in an amount of from 3 to 10% by weight on a dry basis of the weight of the drilling fluid treated, and petroleum oil in an amount sufficient to inhibit substantial foaming of the resulting drilling fluid.

9. A water clay base drilling fluid of suitable viscosity for oil and gas well drilling, said fluid consisting essentially of water, clay and a preferentially oil soluble alkali metal petroleum sulfonate in an amount of from 3 to 10% by weight on a dry basis of the weight of the drilling fluid treated and from 5% to 20% by volume of petroleum oil.

TODD MICHAEL DOSCHER.

REFERENCES CITED

The following references are of record in the file of this patent:

UNITED STATES PATENTS

| Number | Name | Date |
|---|---|---|
| 2,151,029 | Henst | Mar. 21, 1939 |
| 2,209,591 | Barnes | July 30, 1940 |
| 2,216,955 | Moore | Oct. 8, 1940 |
| 2,217,926 | Campen | Oct. 15, 1940 |
| 2,271,696 | Jones | Feb. 3, 1942 |
| 2,331,049 | Schindler | Oct. 5, 1943 |
| 2,360,992 | Weiss | Oct. 24, 1944 |